(12) United States Patent
Crompton et al.

(10) Patent No.: US 7,374,383 B2
(45) Date of Patent: May 20, 2008

(54) FULL-ROUND, OFFSET-HEAD NAIL

(75) Inventors: John R. Crompton, South Meriden, CT (US); Wayne Greene, West Warwick, RI (US); George P. Smith, East Greenwich, RI (US)

(73) Assignee: Stanley Fastening Systems, L.P., East Greenwich, RI (US)

( * ) Notice: Subject to any disclaimer, the term of this patent is extended or adjusted under 35 U.S.C. 154(b) by 0 days.

(21) Appl. No.: 11/281,704

(22) Filed: Nov. 18, 2005

(65) Prior Publication Data

US 2006/0072980 A1   Apr. 6, 2006

Related U.S. Application Data

(62) Division of application No. 10/152,817, filed on May 23, 2002, now Pat. No. 7,014,407.

(51) Int. Cl.
*F16B 15/00*   (2006.01)
*F16B 15/02*   (2006.01)

(52) U.S. Cl. ............. 411/442; 227/136; 227/119; 206/345

(58) Field of Classification Search ........ 411/487, 411/455, 451.5, 485, 480–481, 440–444, 411/486, 923, 491–492, 483–484, 476, 451.1; 206/439, 343, 345; 227/136, 119
See application file for complete search history.

(56) References Cited

U.S. PATENT DOCUMENTS

| | | | | |
|---|---|---|---|---|
| 243,603 A * | 6/1881 | Newton | ...... | 411/455 |
| 305,677 A * | 9/1884 | De Bus | ...... | 217/93 |
| 328,103 A * | 10/1885 | Boyd | ...... | 411/452 |
| 335,563 A * | 2/1886 | Chaplin | ...... | 411/487 |
| 353,427 A * | 11/1886 | Philips | ...... | 411/455 |
| 376,791 A * | 1/1888 | Sweet | ...... | 411/492 |
| 490,439 A * | 1/1893 | Howes | ...... | 411/491 |
| 493,144 A * | 3/1893 | Adler | ...... | 411/451.5 |
| 519,511 A * | 5/1894 | Thompson | ...... | 411/486 |
| 546,269 A * | 9/1895 | Coutant | ...... | 411/455 |
| 548,811 A * | 10/1895 | Cole et al. | ...... | 411/487 |
| 650,248 A * | 5/1900 | Hennigan | ...... | 411/486 |
| 698,843 A * | 4/1902 | Miner | ...... | 411/454 |
| 900,570 A * | 10/1908 | Morris | ...... | 238/295 |
| 1,084,372 A * | 1/1914 | Sommermeyer | ...... | 411/450 |
| 1,152,656 A * | 9/1915 | Payne | ...... | 411/492 |
| 1,214,436 A * | 1/1917 | Curry | ...... | 238/295 |
| 1,272,071 A * | 7/1918 | Madeley | ...... | 411/451.5 |
| 1,373,875 A * | 4/1921 | Fallon | ...... | 411/455 |
| 1,416,971 A * | 5/1922 | Osborne | ...... | 411/451.3 |
| 1,680,351 A * | 8/1928 | Warne | ...... | 411/494 |
| RE19,792 E * | 12/1935 | Rosenberg | ...... | 411/455 |
| 2,468,821 A * | 5/1949 | Goodstein | ...... | 411/487 |
| 2,874,603 A | 2/1959 | Boettcher | | |
| 2,880,480 A * | 4/1959 | True, Jr. | ...... | 403/231 |
| 2,940,081 A * | 6/1960 | Juilfs | ...... | 206/343 |
| 3,096,680 A * | 7/1963 | Dudgeon | ...... | 411/480 |
| 3,152,334 A * | 10/1964 | Lingle | ...... | 206/344 |
| 3,208,328 A * | 9/1965 | Myers | ...... | 411/386 |
| 3,358,822 A * | 12/1967 | O'Connor | ...... | 206/344 |
| 3,359,582 A | 12/1967 | Powers | | |
| 3,481,459 A * | 12/1969 | Becht | ...... | 206/343 |
| 3,696,701 A * | 10/1972 | Readyhough | ...... | 206/343 |
| 3,828,924 A * | 8/1974 | Perkins | ...... | 206/343 |
| 3,835,991 A * | 9/1974 | Brecht | ...... | 206/343 |
| 3,861,526 A * | 1/1975 | Leistner | ...... | 206/343 |
| 3,861,527 A * | 1/1975 | Perkins | ...... | 206/344 |
| 3,894,469 A * | 7/1975 | Nilsson | ...... | 411/40 |
| 3,921,496 A * | 11/1975 | Helderman | ...... | 411/17 |
| 3,935,945 A * | 2/1976 | Smith et al. | ...... | 206/343 |
| 3,966,042 A * | 6/1976 | Shelton et al. | ...... | 206/344 |
| 3,983,995 A * | 10/1976 | Readyhough | ...... | 206/343 |
| 4,002,098 A * | 1/1977 | Colechia | ...... | 411/443 |
| 4,011,785 A * | 3/1977 | Schrepferman | ...... | 411/545 |
| 4,013,207 A | 3/1977 | Erkenbrack | | |
| 4,234,991 A * | 11/1980 | Lange | ...... | 470/157 |
| 4,250,996 A * | 2/1981 | Bartz | ...... | 206/343 |
| 4,279,190 A * | 7/1981 | Hummel | ...... | 411/487 |
| 4,343,579 A | 8/1982 | Shelton et al. | | |
| 4,599,842 A * | 7/1986 | Counihan | ...... | 52/586.2 |
| 4,815,910 A * | 3/1989 | Potucek | ...... | 411/444 |
| 4,927,309 A | 5/1990 | Sygnator | | |
| 4,932,820 A * | 6/1990 | Schniedermeier | ...... | 411/455 |
| 5,011,354 A * | 4/1991 | Brownlee | ...... | 411/439 |
| 5,020,353 A * | 6/1991 | Christiansen | ...... | 72/187 |
| 5,056,976 A | 10/1991 | Sygnator et al. | | |
| 5,058,228 A | 10/1991 | Wright et al. | | |
| 5,060,797 A * | 10/1991 | Sygnator | ...... | 206/345 |
| 5,154,670 A | 10/1992 | Sygnator et al. | | |
| 5,192,012 A * | 3/1993 | Schafer et al. | ...... | 227/113 |
| 5,195,931 A * | 3/1993 | Wright et al. | ...... | 470/40 |
| 5,391,029 A * | 2/1995 | Fardell | ...... | 411/452 |

(Continued)

FOREIGN PATENT DOCUMENTS

EP        0 481 635 A1     10/1991

*Primary Examiner*—Jack W. Lavinder
(74) *Attorney, Agent, or Firm*—Studebaker & Brackett PC; Tim L. Brackett, Jr.

(57) ABSTRACT

A wire nail for use with a powered nail-driving tool has a full-round head with an axis that is offset from an axis of the integrally formed shank. An outer circumferential surface of the shank is at least as offset from the shank axis in one radial direction as a circumferential surface of the head in that radial direction. Accordingly, such nails may be collated shank-to-shank in a strip of wire nails such that adjoining shanks are both parallel and touching. During manufacture of the wire nail, a notch is formed in the shank at the intersection between the shank and the head. The notch and the head axis are disposed on opposite sides of the shank axis from each other. The notch facilitates improved metal flow during the head-forming procedure and results in strong shank to head connections.

7 Claims, 12 Drawing Sheets

U.S. PATENT DOCUMENTS

| | | | | |
|---|---|---|---|---|
| 5,395,197 A | * | 3/1995 | Cario et al. | 411/442 |
| 5,482,419 A | * | 1/1996 | Leistner | 411/442 |
| 5,519,973 A | * | 5/1996 | Keith et al. | 52/410 |
| 5,588,788 A | * | 12/1996 | Dominguez | 411/482 |
| 5,647,525 A | * | 7/1997 | Ishizawa | 227/113 |
| 5,785,478 A | * | 7/1998 | Rotter | 411/487 |
| 5,870,870 A | * | 2/1999 | Utzman | 52/483.1 |
| 5,909,993 A | | 6/1999 | Leistner | |
| 5,927,922 A | | 7/1999 | Miller | |
| 5,971,688 A | * | 10/1999 | Anstett | 411/456 |
| 5,987,834 A | * | 11/1999 | Keith et al. | 52/410 |
| D418,400 S | | 1/2000 | Juska | |
| 6,010,291 A | | 1/2000 | Schwingle | |
| 6,062,788 A | * | 5/2000 | Ying-Feng | 411/480 |
| 6,086,305 A | * | 7/2000 | Lat et al. | 411/487 |
| 6,112,491 A | * | 9/2000 | Keith et al. | 52/410 |
| 6,511,252 B1 | * | 1/2003 | Andros | 403/283 |
| 6,676,349 B1 | * | 1/2004 | Mey | 411/80.5 |
| 6,676,528 B1 | * | 1/2004 | Carlsen | 470/137 |
| 6,928,778 B2 | * | 8/2005 | Schmid | 52/363 |
| 7,014,407 B2 | * | 3/2006 | Crompton et al. | 411/440 |
| 2001/0022313 A1 | * | 9/2001 | Hamano et al. | 227/119 |
| 2002/0052244 A1 | * | 5/2002 | Halstead et al. | 470/129 |
| 2004/0131924 A1 | * | 7/2004 | Anglin et al. | 429/53 |
| 2005/0017050 A1 | * | 1/2005 | Fujiyama et al. | 227/136 |

* cited by examiner

FULL-ROUND, OFFSET-HEAD NAIL

BACKGROUND OF THE INVENTION

1. Field of the Invention

The present invention relates generally to wire nails and methods of manufacturing wire nails, and more specifically to wire nails that can be densely collated into strips for use in nail-driving tools.

2. Description of Related Art

To facilitate the use of wire nails by pneumatic or electrically powered nail-driving tools, wire nails are typically linearly collated using adhesively applied tapes or other known collating media (e.g., welded connecting wires, glue, etc.) to form strips that can be easily inserted into and used by such nail-driving tools.

Dense collation is preferred to provide the maximum number of nails in the least space. Unfortunately, conventional, full-round head nails (nails having heads with circular cross-sections) with centered heads and shanks cannot be positioned with shanks in parallel, shank-to-shank contacting relation because the heads of adjoining nails interfere with their shanks being disposed in such manner. Various types of wire nails have been developed to resolve this shortcoming. For example, strips of collated wire nails having D-shaped heads are exemplified in Lingle (U.S. Pat. No. 3,152,334), Leistner (U.S. Pat. No. 3,861,526), Shelton et al. (U.S. Pat. No. 3,966,042), and Powers (U.S. Pat. No. 3,359,582). Shanks of such nails abut the flat edge of the D shape of adjoining nail heads such that dense shank-to-shank collation is possible. Other similar head shapes may also be used to enable shank-to-shank collation. See, e.g., Julifs (U.S. Pat. No. 2,940,081) and Becht (U.S. Pat. No. 3,481,459).

Unfortunately, such D-shaped or variant-shaped heads have their own disadvantages. For reasons of aesthetics and performance, it is highly desirable to have nail heads that are full-round. In addition to the inferior aesthetics and performance, D-shaped or variant-shaped heads are more difficult to manufacture than full-round heads. None of the D-shaped or variant heads disclosed in the foregoing patents has a full-round (complete circle) head when viewed along the longitudinal axis of the shank.

Various wire nails have been developed in an effort to balance the advantages of D-shaped/variant-shaped nails with the advantages of full-round head nails. O'Connor (U.S. Pat. No. 3,358,822) and Sygnator et al. (U.S. Pat. No. 5,056,976) disclose full-round head wire nails with heads that are radially offset from their shanks (hereinafter "offset-head nails"). This offset head reduces the degree to which the head of the nail overhangs the shank and improves lateral nail density. Although the overhang is reduced, it still results in gaps between adjoining collated nails. These gaps limit lateral nail density and prevent shank-to-shank collation.

SUMMARY OF THE INVENTION

One aspect of the present invention provides a full-round head wire nail that is collatable with similar full-round head wire nails in shank-to-shank relationship.

Another aspect of the present invention provides a machine and method for manufacturing such a nail.

A further aspect of the present invention provides a full-round head wire nail that may be more densely collated with similar nails than conventional full-round head wire nails.

A further aspect of the present invention provides an improved method of manufacturing offset-head nails by providing stronger head/shank connections.

A further aspect of the present invention provides a wire nail with a full-round head defining a head axis. The nail includes a shank formed integrally with the head and defining a shank axis that is offset from the head axis. The shank has a notch formed therein at an intersection between the shank and the head. The head axis and at least a portion of the notch are disposed on opposing sides of the shank axis.

A further aspect of the present invention provides a strip of collated wire nails having a plurality of wire nails. Each of the plurality of wire nails has a full-round head defining a head axis, and a shank formed integrally with the head and defining a shank axis that is offset from the head axis. The strip also includes a fastener holding the plurality of wire nails in a line such that the shank axes of adjoining nails are parallel to each other and such that the shanks of adjoining nails touch each other.

A further aspect of the present invention provides a wire nail with a full-round head having a first circumferential surface that defines a head axis. The nail includes a shank formed integrally with the head. The shank has a second outer surface that defines a shank axis that is offset from the head axis. In a radial direction relative to the shank axis, the second outer surface is spaced from the shank axis by a distance that is greater than or equal to a distance between the shank axis and the first surface in that radial direction.

A further aspect of the present invention provides a method of manufacturing a wire nail. The method involves forming a notch in a wire strand between a shank portion and a head-forming portion of the wire strand, the wire strand having a shank axis, and subsequently compressing the head-forming portion into a full-round head having a head axis that is offset from the shank axis and is disposed at least in part on an opposite side of the shank axis from the notch.

A further aspect of the present invention provides a method of manufacturing a wire nail using a wire strand having a wire strand axis and a peripheral surface. The method involves compressing a head-forming portion of a wire strand into a full-round head having a head axis that is offset from the wire strand axis. A circumferential edge of the head is, in a radial direction relative to the strand axis, spaced from the strand axis by a distance that does not exceed a distance between the strand axis and the peripheral surface in said radial direction.

Additional and/or alternative objects, features, aspects, and advantages of the present invention will become apparent from the following description, the accompanying drawings, and the appended claims.

BRIEF DESCRIPTION OF THE DRAWINGS

For a better understanding of the present invention as well as other objects and further features thereof, reference is made to the following description which is to be used in conjunction with the accompanying drawings, where.

DETAILED DESCRIPTION OF PREFERRED EMBODIMENTS OF THE INVENTION

It is noted that the terms herein are to be given a practical connotation, as would be understood by one of ordinary skill in the art, bearing in mind the usual manufacturing tolerances encountered in the conventional nail manufacturing art. For example, the terms "full-round head" and "circular" are not limited to perfect circles, but, rather, are intended to encompass heads that are manufactured within conventional tolerances to be substantially circular or round. Similarly, a "cylindrically" shaped shank or a shank with a circular cross-section need not be perfectly cylindrical or circular. For example, imperfections, notches, etc. such as the ridges formed by gripping machines do not stop the shank from being cylindrical or circular in cross section.

Figure 1:
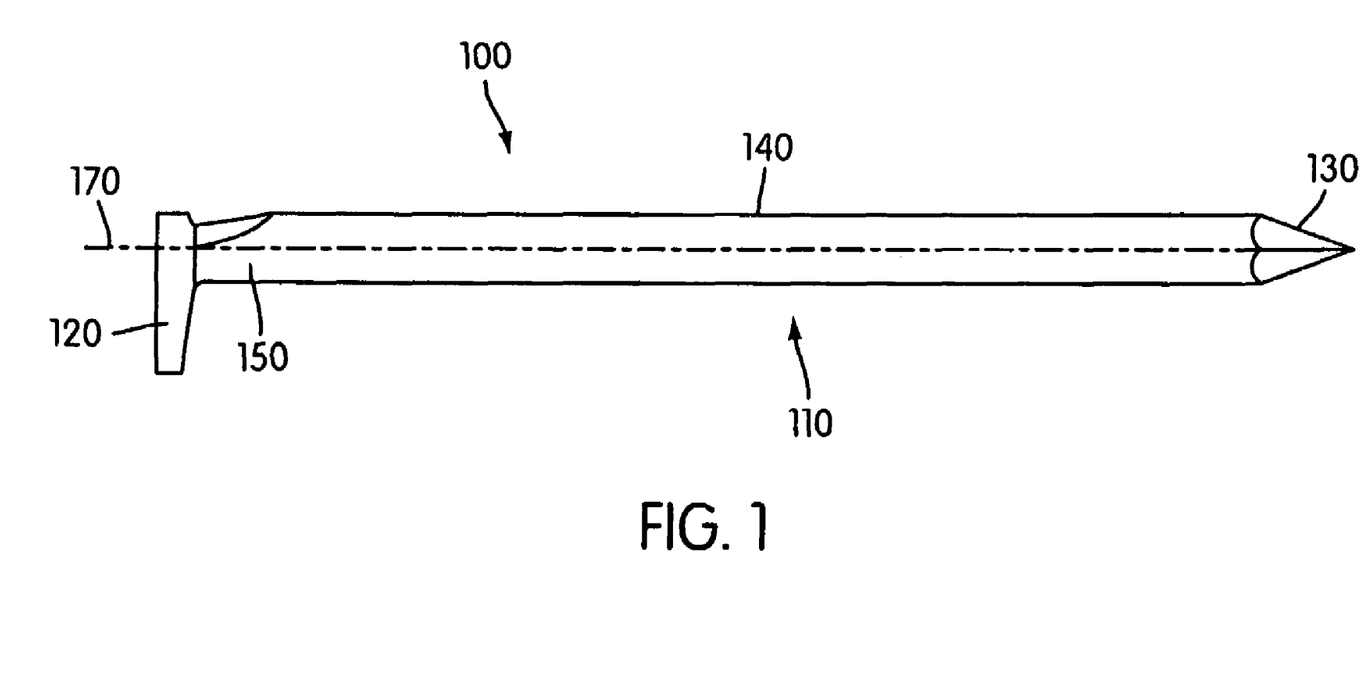
FIG. 1 is a side view of a wire nail according to one embodiment of the present invention.

The inventor of the present invention sought to design a wire nail that can be collated shank-to-shank (i.e. with adjoining shanks touching each other and parallel) (see FIG. 7) to maximize lateral nail density without sacrificing the performance, aesthetic, and manufacturing advantages of a full-round head nail. As illustrated in FIG. 1, the inventor developed a nail 100 with a shank 110 that is offset from a full-round head 120 such that the nail 100 can be collated shank-to-shank.

As illustrated in FIG. 1, the shank 110 includes a tip 130, a main portion 140, and a reduced neck portion 150. The tip 130 is preferably pointed and is formed in a conventional manner to help the nail 100 pierce an object into which the nail 100 is driven.

Figure 2:
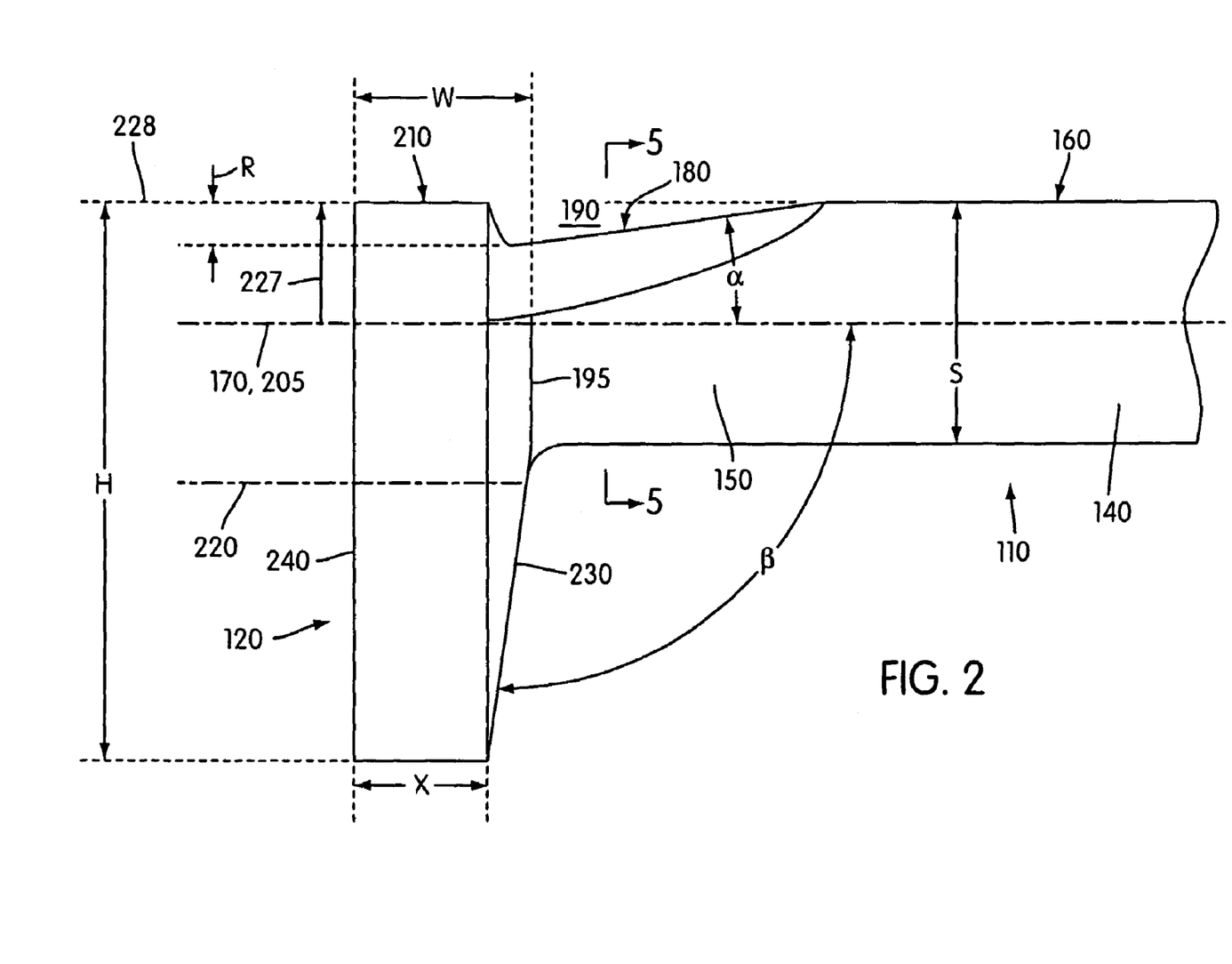
FIG. 2 is an enlarged, partial, side view of the wire nail of FIG. 1.

As illustrated in FIGS. 1-4, the main portion 140 of the shank 110 is longitudinally elongated, extends rearwardly (right to left in FIGS. 1 and 2) from the tip 130, and has a circular cross-section with a diameter S (see FIG. 2). The diameter S is determined by the diameter of the wire used to construct the nail 100. The main portion 140 includes a cylindrically-shaped outer surface 160 that defines a longitudinal shank axis 170.

While the main portion 140 of the shank 110 has a circular cross-section in the present embodiment, other cross-sectional shapes may alternatively be used without deviating from the scope of the present invention. If an alternative cross-section is used, the shank axis 170 would be defined by a center of the cross-sectional area of the main portion 140 of the shank 110.

Figure 4:
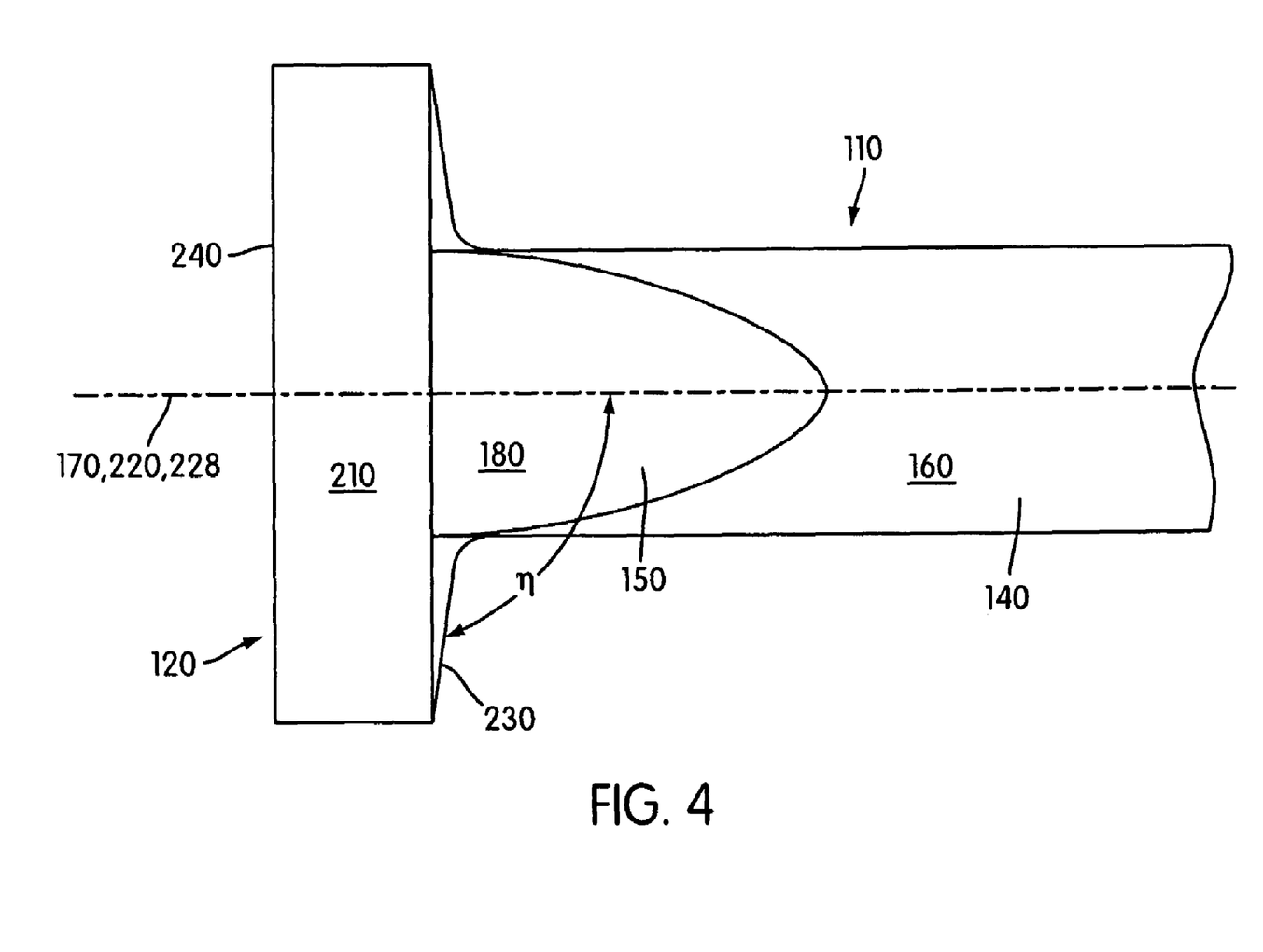
FIG. 4 is an enlarged, partial, top view of the wire nail of FIG. 1.

As best illustrated in FIGS. 2 and 4, the reduced neck portion 150 of the shank 110 extends longitudinally rearwardly from the main portion 140 to the head 120. An upper surface 180 of the reduced neck portion 150 tapers radially inwardly as it progresses rearwardly toward the head 120, thereby defining a notch 190 that distinguishes the reduced neck portion 150 from the main portion 140 of the shank 110. The purpose of the notch 190 will be explained later. The upper surface 180 and notch 190 are generally formed at the intersection between the shank 110 and the head 120. In the illustrated embodiment, the notch 190 extends rearwardly slightly into the head 120. However, the notch 190 may alternatively extend rearwardly only up to the forward edge 195 of the head 120.

A depth R of the notch 190 is the deepest at the intersection between the head 120 and the shank 110 (or slightly rearwardly within the head 120) and is measured relative to the outer surface 160 of the main portion 140 of the shank 110. The depth R corresponds to a maximum shank 110 reduction and is preferably greater than 0.010 inches, and more preferably greater than 0.015 inches. Relative to a diameter H of the head 120 (see FIG. 2), the depth R is preferably between 2.4% and 33% of the head diameter H, and more preferably between 5% and 10% of the head diameter H. Relative to the shank diameter S, the depth R is preferably between 10% and 50% of the shank diameter R, and more preferably between 12% and 20%. Because the notch 190 reduces the cross-sectional area of the reduced neck portion 150, the reduced neck portion 150 has a smaller cross-sectional area than the main portion 140 of the shank 110.

As viewed from the side in FIG. 2, the forward portion of the illustrated upper surface 180 tapers radially inwardly at a constant rate. Accordingly, a line defined by the forward upper edge of the upper surface 180 forms an acute angle α with the shank axis 170. However, the upper surface 180 and corresponding notch 190 may have a variety of other shapes without departing from the scope of the present invention. A slight curve/camber is formed between the rearward edge of the surface 180 and the head 120 to improve metal flow during manufacture of the nail 100.

Figure 5:
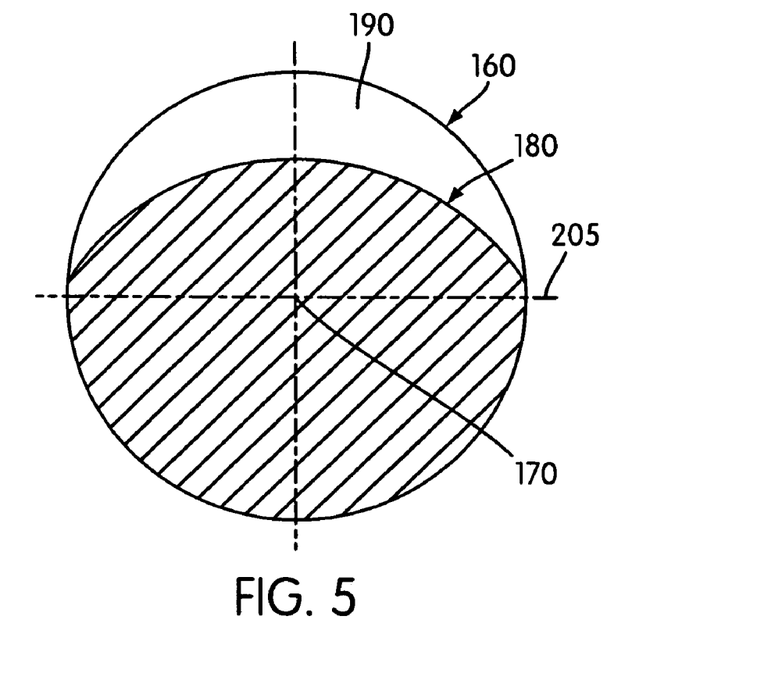
FIG. 5 is a sectional view, taken along the line 5-5 in FIG. 2, of the wire nail of FIG. 1.
Figure 6:
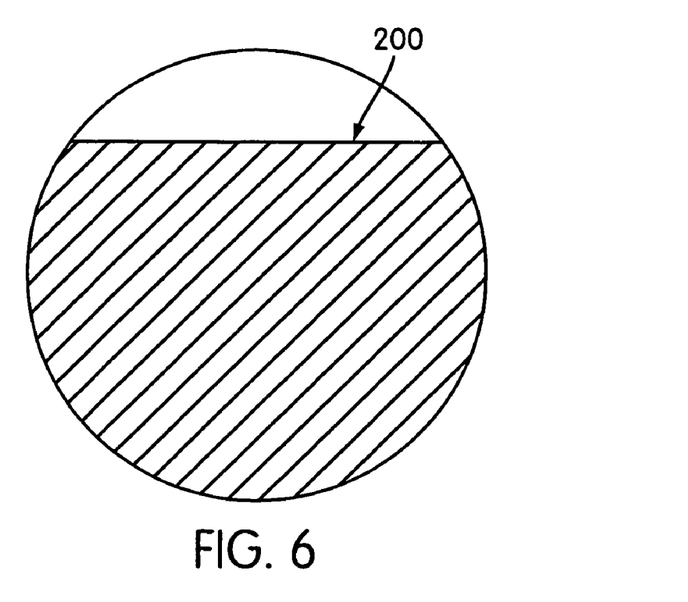
FIG. 6 is a sectional view of a wire nail of an alternative embodiment of the present.

FIG. 5 is a cross-sectional view of the reduced neck portion 150 taken along the line 5-5 in FIG. 2. As illustrated, the cross-sectional shape of the upper surface 180 (and corresponding notch 190) is arc-shaped or curved. However, the cross-sectional shape of the upper surface 180 may have a variety of other shapes without departing from the scope of the present invention. For example, as illustrated in FIG. 6, a surface 200 having a linear cross-sectional shape may alternatively be incorporated into the nail 100 without departing from the scope of the present invention. Regardless of the shape of the upper surface 180 and notch 190, it is preferred that the upper surface 180 and notch 190 cover approximately 180 degrees or less of the circumference of the shank 110. Accordingly, as illustrated in FIG. 5, the surface 180 and notch 190 preferably do not cross below a plane 205 that extends horizontally outwardly from the shank axis 170.

Figure 3:
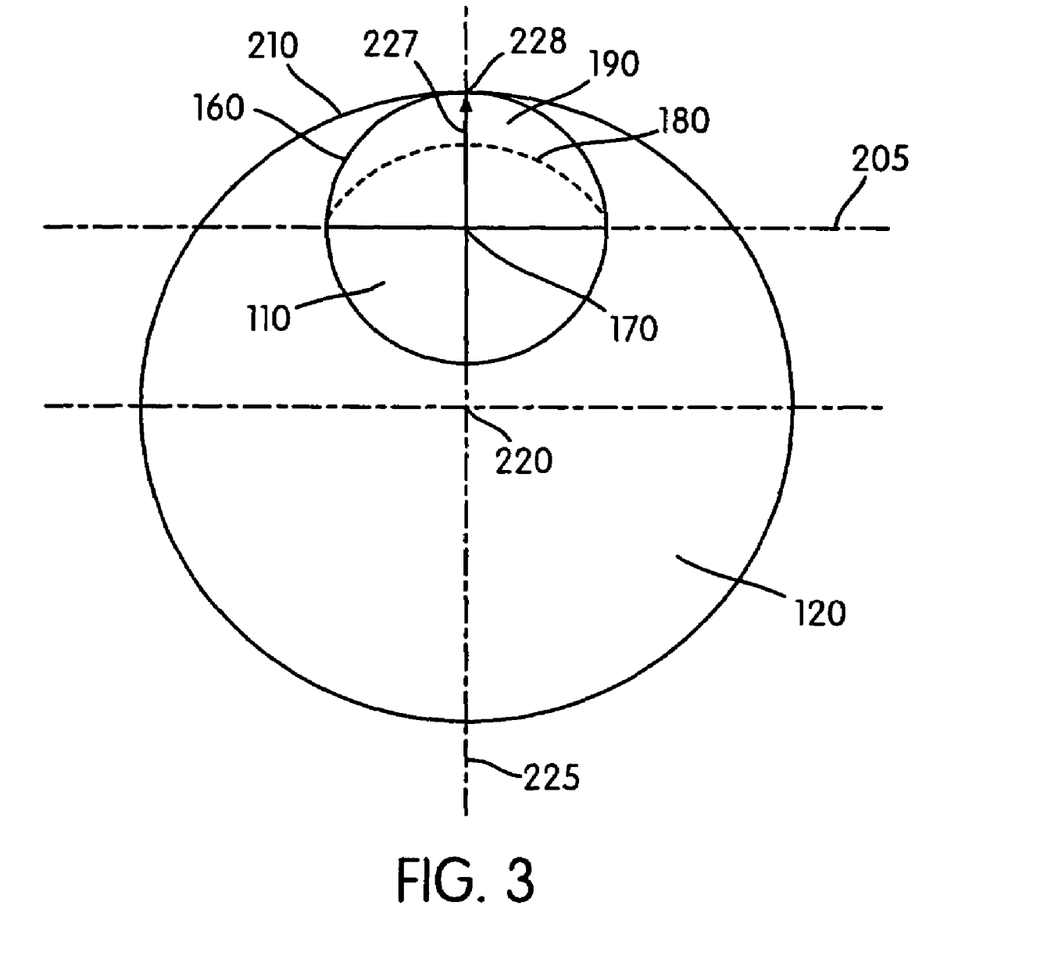
FIG. 3 is a front view of the wire nail of FIG. 1.

As illustrated in FIGS. 2 and 3, the head 120 is a full-round (i.e., circular) and has a circumferential edge (or outer surface) 210 with the diameter H and a maximum longitudinal width W. The diameter H is preferably at least 25% larger than the diameter S of the main portion 140 of the shank 110. The head 120 has a longitudinally extending head central axis 220 that is offset from the shank central axis 170. While not required of the present invention, in the present embodiment, the head axis 220 is also parallel to the shank axis 170. As viewed from the side of the nail 100 (see FIG. 2), the head axis 220 and at least a portion of the notch 190 (or surface 180) are disposed on opposing sides of the sank axis 170 and plane 205 from each other. In this embodiment (see FIG. 3), the notch 190 and head axis 220 are diametrically opposed relative to the shank axis 170 such that a line 225 can be formed between the head axis 220, the shank axis 170, and a center of the upper surface 180 or notch 190. While such diametric opposition is preferred for reasons that will be discussed later, it is not required by the scope of the present invention. Because of the opposed relative positioning of the notch 190 and head axis 220, the surface 180 (or notch 190) extends toward the head axis 220 as the surface 180 extends toward (and slightly into) the head 120. In other words, a center of the cross-sectional area of the reduced neck portion 150 moves toward the head axis 220 as the reduced neck portion 150 extends toward the head 120.

Upper portions of the circumferential edge/surface 210 of the head 120 and the outer surface 160 of the shank 110 are equally offset from the shank axis 170 in a radial direction 227 that extends upwardly as viewed in FIGS. 2 and 3. A reference line 228 is parallel to and offset from the shank axis 170 by the radius of the shank 110. The radial direction 227 extends from the shank axis 170 to the reference line 228. The reference line 228 is preferably disposed on or close to the line 225 (see FIG. 3) so that the reference line 228 is disposed in the same area as the notch 190. As would be appreciated by one of ordinary skill in the art of wire nails, the term "equally offset" is to be understood within the context of the dimensional tolerances that are associated with the art of wire nail manufacturing. Accordingly, "equally offset" surfaces 160, 210 may or may not be exactly equally offset due to acceptable dimensional irregularities and tolerances.

Figure 7:
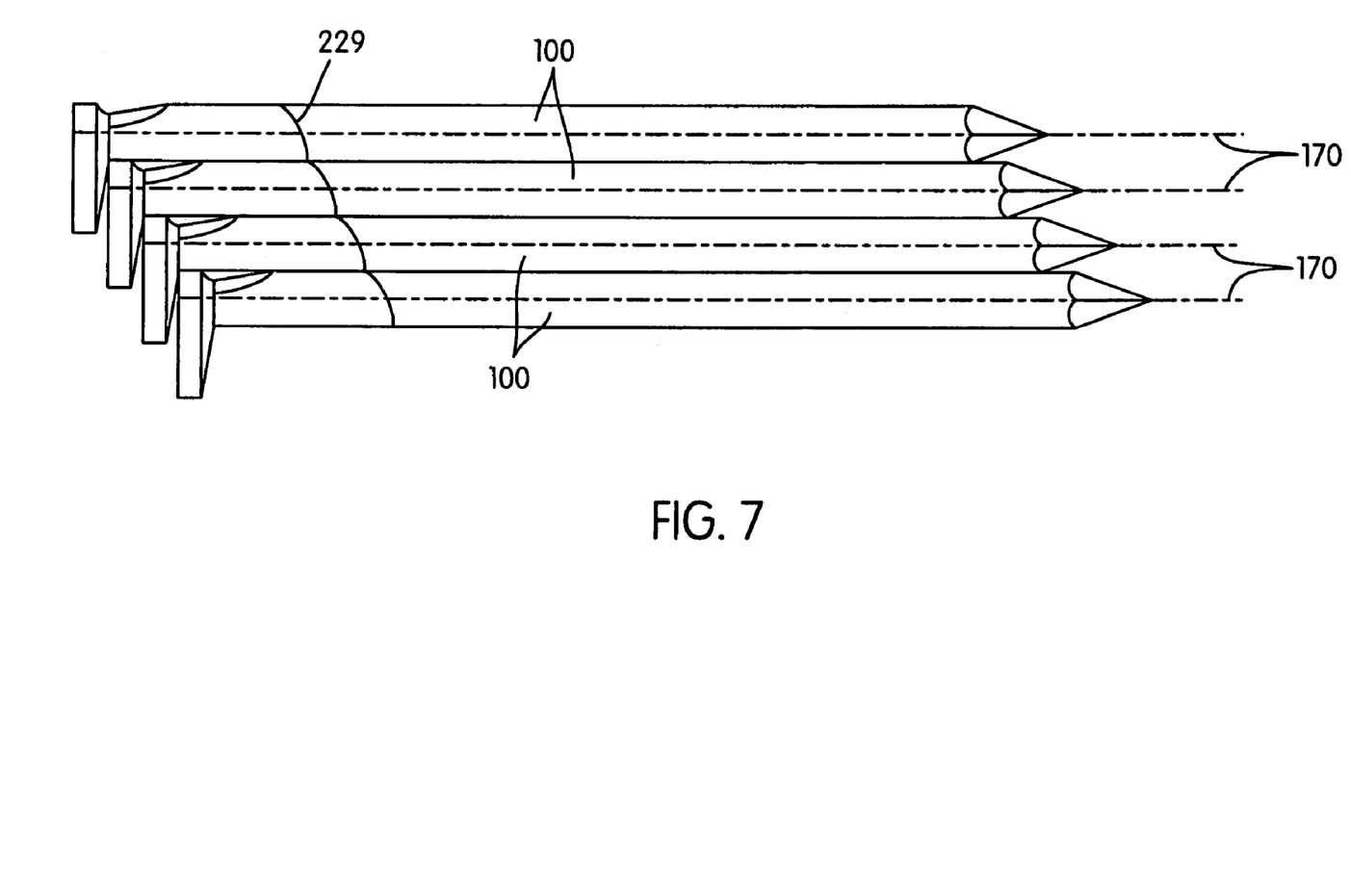
FIG. 7 is a side view of a plurality of collated wire nails according to the embodiment of the present invention illustrated in FIG. 1.

As illustrated in FIGS. 2 and 7, because portions of the surfaces 160, 210 are equally offset from the shank axis 170, the head 120 does not interfere with the dense collation of the nails 100. Accordingly, multiple nails 100 may be collated in a dense shank-to-shank manner such that surfaces 160 of adjoining shanks 110 touch each other along the longitudinal extent of the surfaces 160. For the surfaces 160 to be "continuously touching," the surfaces 160 need not be perfectly continuously touching and are usually not perfectly continuously touching due to manufacturing tolerances, gripping ridges, axial spacing between adjoining nails 100 along the axes 170, etc. as would be appreciated by one of ordinary skill in the art. The space between the shank axes 170 of adjacent nails 100 is therefore limited to a distance that is approximately the diameter S of the main portion 140 of the shank 110. As would be appreciated by one of ordinary skill in the art, "touching" shanks 110 are still touching if an adhesive is disposed between adjacent shanks 110. For example, if the nails 100 are coated with an adhesive, the shanks 110 of adjacent nails 100 still touch each other even though the metal portions of the shanks 110 are separated from each other by the thickness of the adhesive. Collated nails 100 may also be coated after collation, although the coating may not completely cover each shank 110 at the intersection between adjoining surfaces 160.

As illustrated in FIG. 7, a fastener 229 connects the collated nails 100 together. The illustrated fastener comprises a thin wire that is welded to the collated nails 100. A matching thin wire (not shown) is preferably fastened to the opposite side of the collated nails 100. While welding is preferred, the thin wire 229 may alternatively be glued, soldered, or otherwise fixed to each nail 100. Further, a variety of other fasteners may also be used without departing from the scope of the present invention. For example, adjoining nails 100 may be taped, glued or otherwise lightly fixed to each other. Regardless of the fastener used, the bond between the nails 100 should be weak enough that it breaks when a nail 100 is driven by a nail-driving tool.

As viewed from the side in FIG. 2, a forward surface 230 of the head 120 defines a chamfer that forms a slightly obtuse angle $\beta$ with the shank axis 170. The angle $\beta$ is preferably between 90 and 120 degrees, is more preferably between about 90 and 115 degrees, and is even more preferably about 110 degrees. The intersection between the forward surface 230 of the head and the shank 110 is slightly curved/cambered to improve metal flow during manufacture of the nail 100.

Throughout this description, the angle $\beta$ identifies the chamfer angle as viewed in FIG. 2. As the chamfer extends circumferentially around the shank axis 170, the axial length (along the shank axis 170) of the chamfer preferably remains relatively constant while the radial distance of the chamfer varies due to the offset positioning of the head 120. Consequently, except where the notch 190 intervenes, the surface 230 has an offset frusta-conical shape with a large diameter rearward end matching and aligning with the diameter H of the head 120 and a small diameter forward end matching and aligning with the diameter S of the shank 110. Accordingly, a chamfer angle like the angle $\beta$ formed between the shank axis 170 and the surface 230 increases as the chamfer pivots about the shank axis 170 away from the view shown in FIG. 2. For example, as illustrated in FIG. 4, a chamfer angle $\eta$ formed between the axis 170 and the surface 230 as viewed in FIG. 4 is larger than the angle $\beta$.

As illustrated in FIG. 2, the head 120 has a minimum width X at a rearward end of the chamfer. The minimum width X should be sufficiently thick that it provides a strong head 120. A rearward surface 240 of the head 120 is preferably perpendicular to the shank axis 170. Consequently, the minimum width X and the angle $\beta$ dictate the maximum width W of the head 120. If the chosen angle $\beta$ approaches 90 degrees, the width X approaches the width W and the width W can be minimized. When the nails 100 are collated (see FIG. 7), adjoining nails 100 are longitudinally (in a direction along the shank axis 170) spaced from each other by approximately the width W of the head 120 (see FIG. 7). Accordingly, minimizing width W by setting the angle $\beta$ close to 90 degrees maximizes the longitudinal nail density in the direction of the axes 170. On the other hand, angle $\beta$ is preferably at least slightly obtuse because the resulting radial taper in the head 120 between the forward and rearward surfaces 230, 240 facilitates improved metal flow during manufacture of the nail 100.

TABLE 1 illustrates the dimensions of three exemplary nails A, B, and C according to the present invention. Exemplary nails A, B, and C are illustrative examples of nails 100 only and their dimensions are not intended to limit the scope of the present invention.

TABLE 1

Dimensions of Exemplary Nails A, B, and C

| Exemplary Nail | Shank Diameter S (in.) | Head Diameter H (in.) | Shank Reduction R (in.) |
| --- | --- | --- | --- |
| A | 0.112 | 0.26 | 0.018 |
| B | 0.117 | 0.27 | 0.018 |
| C | 0.128 | 0.29 | 0.017 |

Figure 9:
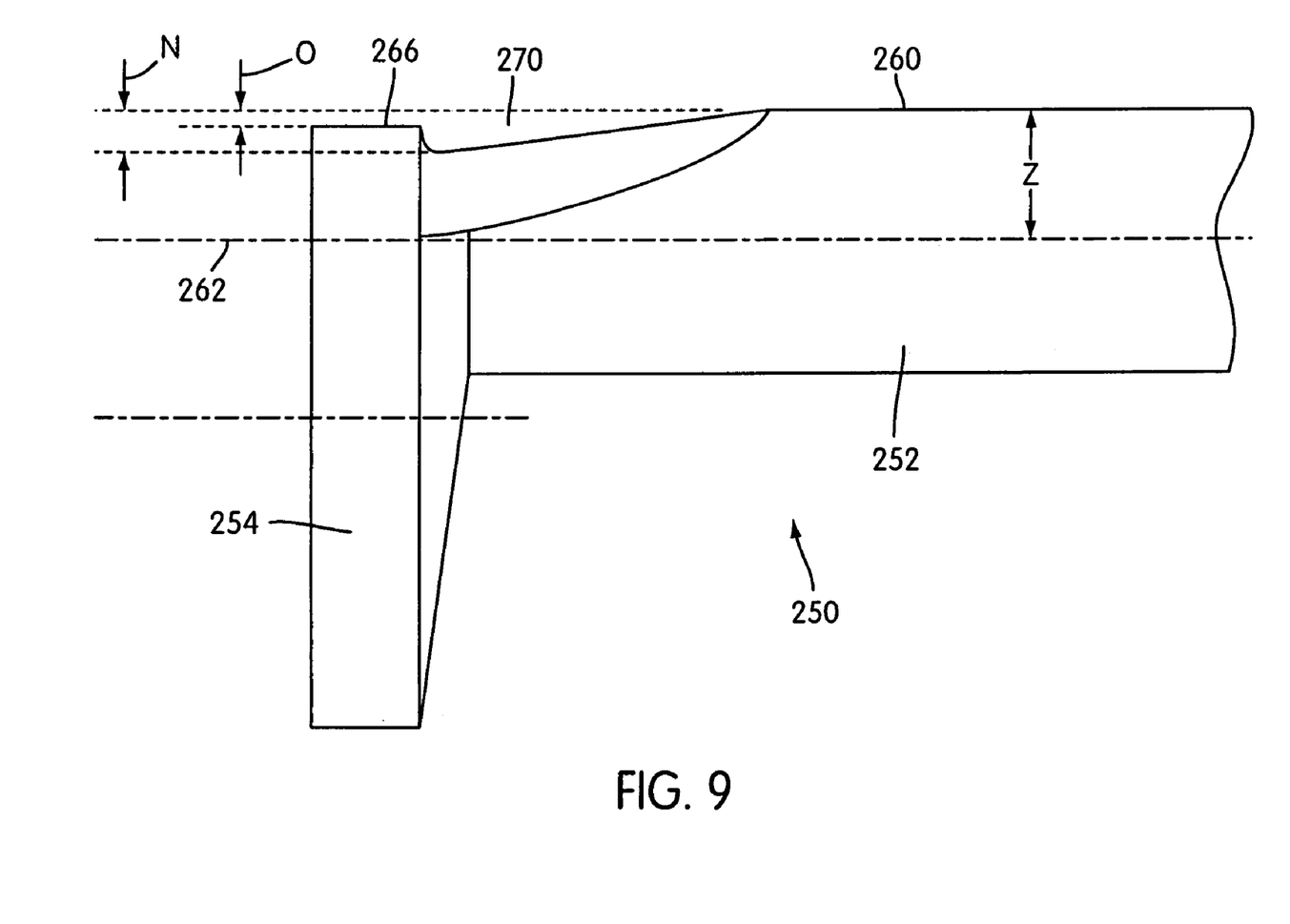
FIG. 9 is a partial side view of a wire nail according to a further embodiment of the present invention.

FIG. 9 illustrates an additional nail 250 according to the present invention, which is generally similar to the nail 100. Accordingly, a redundant description of the identical features is not provided. The nail 250 differs from the nail 100, however, in that a shank 252 of the nail 250 is more offset from its head 254 than in the nail 100. Consequently, a surface 260 of a main portion of the shank 252 extends outwardly in one radial direction (upwardly as viewed in FIG. 9) from a shank axis 262 beyond a circumferential surface 266 of the head 254 by an offset O. The offset O may be extremely small (or zero) such that the nail 250 is virtually identical to the nail 100. Alternatively, the offset O may be more substantial. Accordingly, a separation between the circumferential edge 266 of the head 254 and the shank axis 262 is less than or equal to a radius Z of the shank 252 in one radial direction relative to the shank axis 262. The offset O is preferably less than 0.1", is more preferably less than 0.01", and is even more preferably less than 0.005". The offset O is also preferably at least slightly smaller than a depth N of a notch 270.

Alternatively, the offset O may be negative such that the surface 266 of the head 254 extends radially outwardly beyond the surface 260 of the shank 252 in all radial directions relative to the shank axis. While such a negative offset O would prevent completely shank-to-shank collation, the resulting nail is still advantageous because the notch 270 strengthens the head/shank connection.

Figure 10:
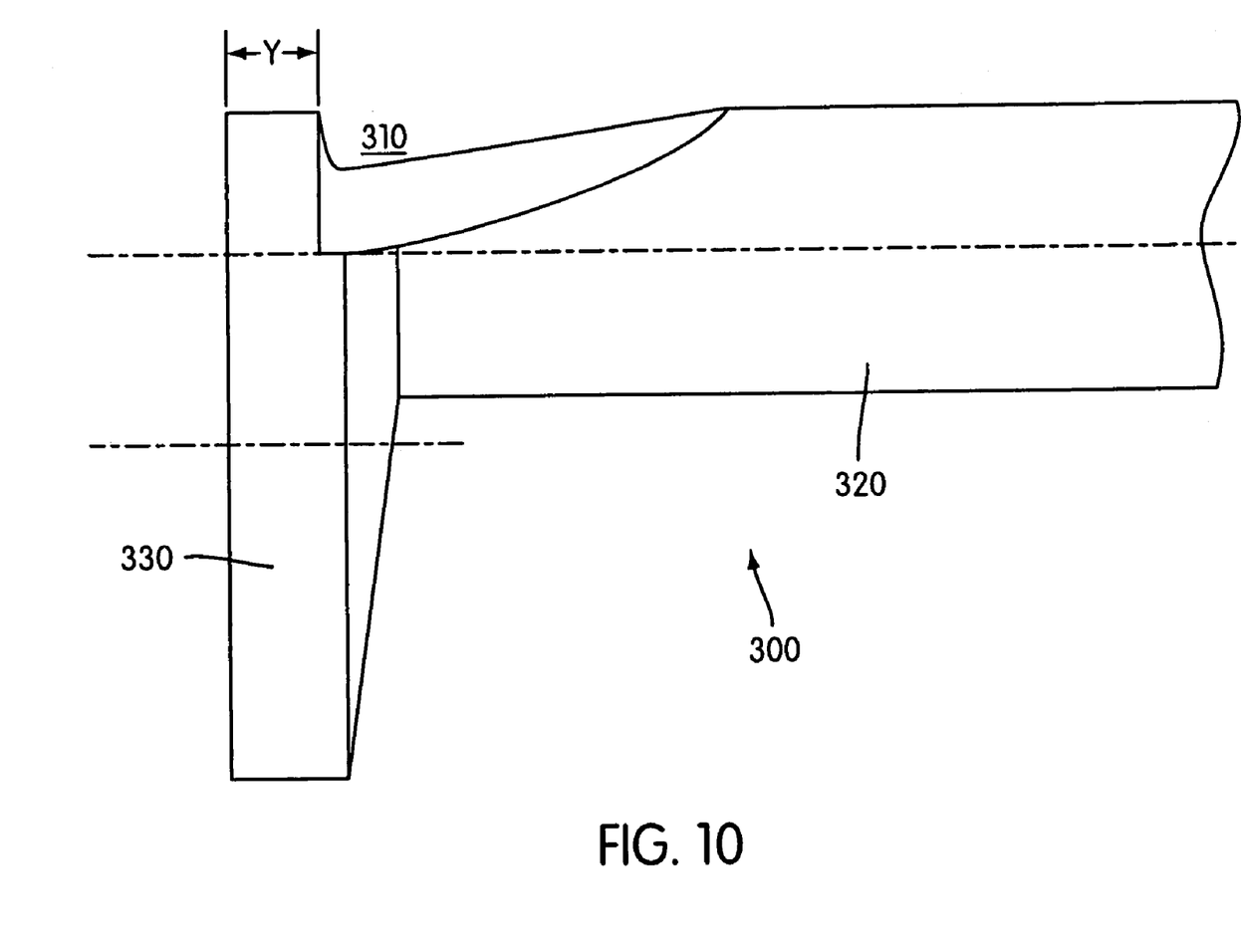
FIG. 10 is a partial side view of a wire nail according to a further embodiment of the present invention.

FIG. 10 illustrates an additional nail 300, which is generally similar to the nail 100. Accordingly, a redundant description of the identical features is not provided. The nail 300 differs from the nail 100 in that a notch 310 formed between the shank 320 and the head 330 of the nail 300 extends longitudinally rearwardly farther into the head 330 than the notch 190 of the nail 100. Alternatively, a notch may also extend less rearwardly such that it extends only to a forward edge of the head. Consequently, the nail 300 has a relatively narrower width Y at its upper edge than at its lower edge.

Hereinafter, a manufacturing machine 400 for the nail 100 is described with reference to FIGS. 11-17. The nail manufacturing machine 400 includes opposing gripping elements 410, 420, a bending machine 430, a head punch 440, and a tip cutter 445.

Figure 11:
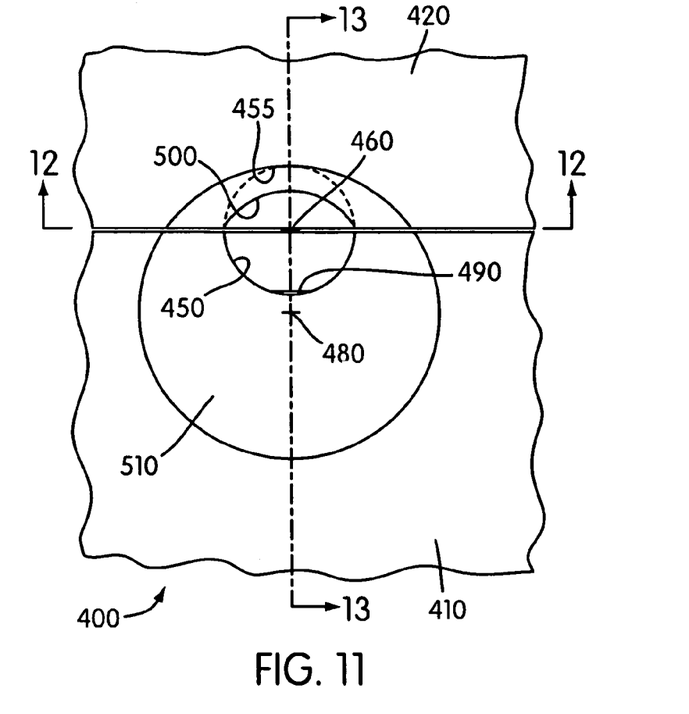
FIG. 11 is a partial front view of a wire nail manufacturing machine according to the present invention.
Figure 12:
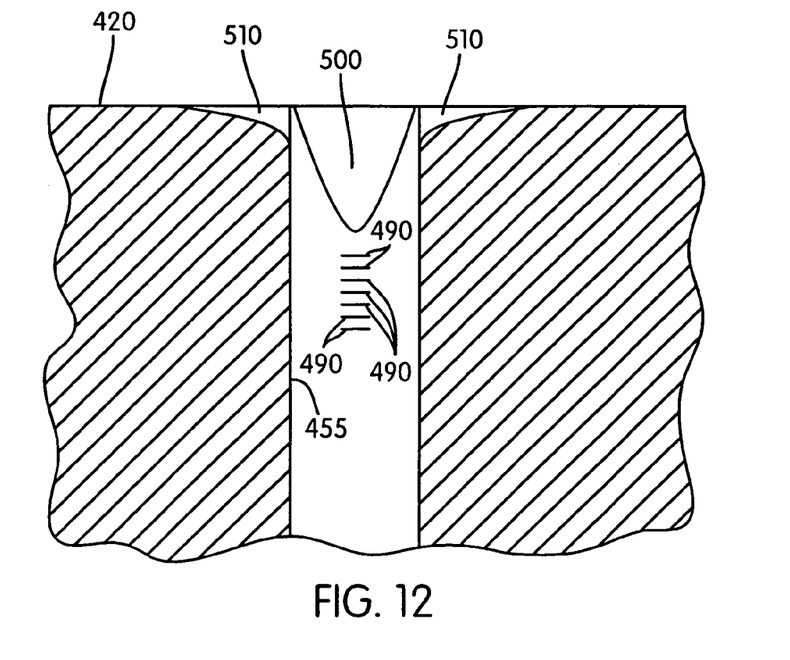
FIG. 12 is a sectional view of the wire nail manufacturing machine illustrated in FIG. 11, taken along the line 12-12 in FIG. 11.
Figure 13:
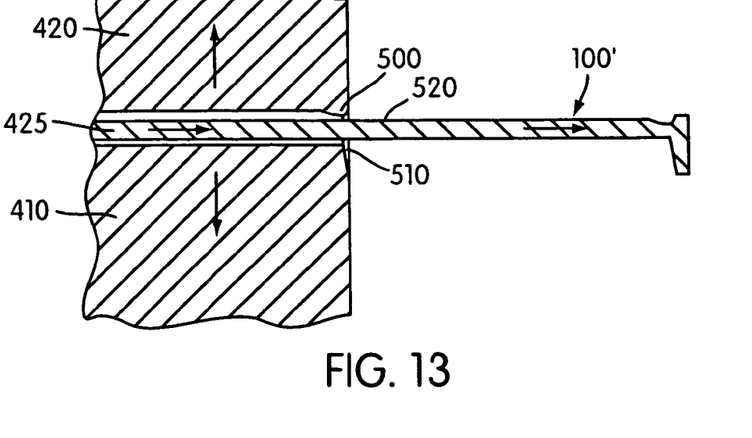
FIGS. 13-17 are sectional views of the wire nail manufacturing machine illustrated in FIG. 11, taken along the line 13-13 in FIG. 11.

FIGS. 11 and 12 illustrate the gripping elements 410, 420. As illustrated in FIG. 13, the gripping element 420 moves downwardly relative to the gripping element 410 to grip a wire strand 425. As best illustrated in FIGS. 11 and 12, the gripping elements 410, 420 each include a half-cylinder shaped groove 450, 455, respectively, with a diameter that is about the same size as the wire strand 425. When the machine 400 closes the gripping elements 410, 420, the grooves 450, 455 define a cylinder with an axis 460 that aligns with an axis of the wire strand 425 and the axis 170 of the shank 110 of the yet-to-be-formed nail 100. Accordingly, the axis 460 defines a parting line between the gripping elements 410, 420.

As illustrated in FIG. 12, axially-spaced transverse ridges or protrusions 490 are formed in the half-cylinder grooves 450, 455 and extend radially inwardly toward the axis 460. When the gripping elements 410, 420 grip the wire strand 425, the ridges 490 form small dimples in the shank 110 of the nail 100 and help to hold the shank 110 in place axially as the head 120 is formed.

As illustrated in FIGS. 11 and 12, the half-cylinder groove 455 in the gripping element 420 also includes a protrusion 500 that protrudes radially-inwardly toward the axis 460. The protrusion 500 is positioned and shaped to form the notch 190 in the nail 100 when the gripping elements 410, 420 come together and grip the wire strand 425.

As illustrated in FIG. 11, when the gripping elements 410, 420 are closed, they combine to form a circular, head-shaped depression 510 having an axis 480 that aligns with the axis 220 of the head 120 of the nail 100 when the head 120 is formed. The surface of the head-shaped depression 510 mimics the chamfer/forward surface 230 of the head 120 of the nail 100. A majority of the head-shaped depression 510 is formed in the gripping element 410 because the head 120 is offset from the shank 110 and the parting line between the gripping elements 410, 420.

The wire strand 425 is preferably A.I.S.I C1018 low carbon steel with a diameter that matches the diameter of the shank 110 of the nail 100. Accordingly, the wire strand 425 is sufficiently stiff. A variety of other materials may be used for the wire strand 425 without deviating from the scope of the present invention.

Hereinafter, the sequential manufacturing process used by a nail manufacturing machine 400 to produce the nail 100 is described with reference to FIGS. 13-17.

As illustrated in FIG. 13, the machine 400 opens the gripping elements 410, 420 and then moves the wire strand 425 to the right, thereby pushing a previously formed nail 100' away from the gripping elements 410, 420. The machine 400 pushes the wire strand 425 sufficiently far to the right that a head-forming end 520 of the nail 100 extends into and slightly beyond the head-shaped depression. 510.

Figure 14:
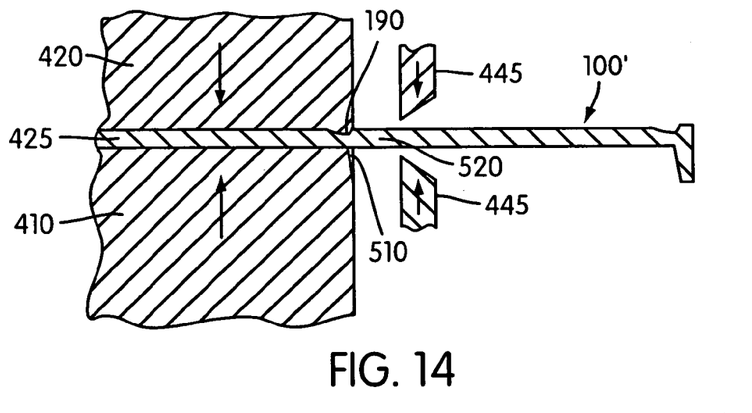

As illustrated in FIG. 14, the machine 400 then closes the gripping elements 410, 420 to grip the wire strand 425 and form the notch 190. The notch 190 forming process may bend the head-forming end 520 downwardly slightly toward the center of the head-shaped depression 510. The tip cutter 445 then forms the tip 130 of the nail 100' and separates the nail 100' from the head-forming end 520 of the nail 100.

Figure 15:
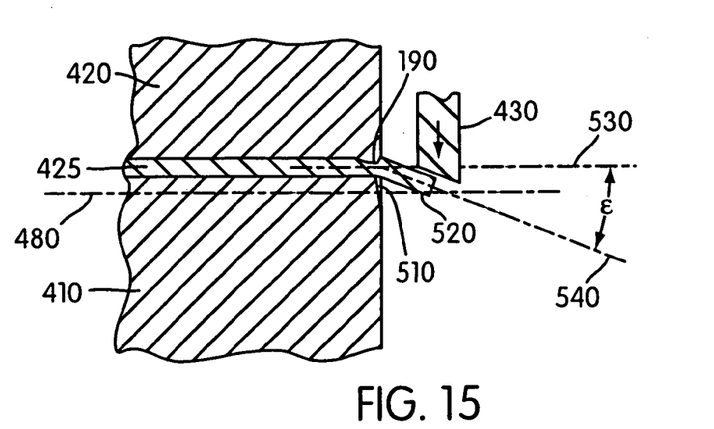

As illustrated in FIG. 15, the bending machine 430 next prebends the head-forming end 520 downwardly toward the center of the head-shaped depression 510 and away from the notch 190. A resulting angle $\epsilon$ formed between an axis 530 of the main wire strand 425 and an axis of 540 the head-forming end 520 of the wire strand 425 is acute. The angle $\epsilon$ is preferably between 5 and 50 degrees, is more preferably between 10 and 35 degrees, and even more preferably about 15 degrees. The prebend preferably positions a center of mass of the head-forming end 520 close to the axis 480 of the head-shaped depression (and the axis 220 of the yet-to-be-formed head 120). The bending machine 430 then retreats away from the head-shaped depression 510 to avoid interfering with the head punch 440.

Figure 16:
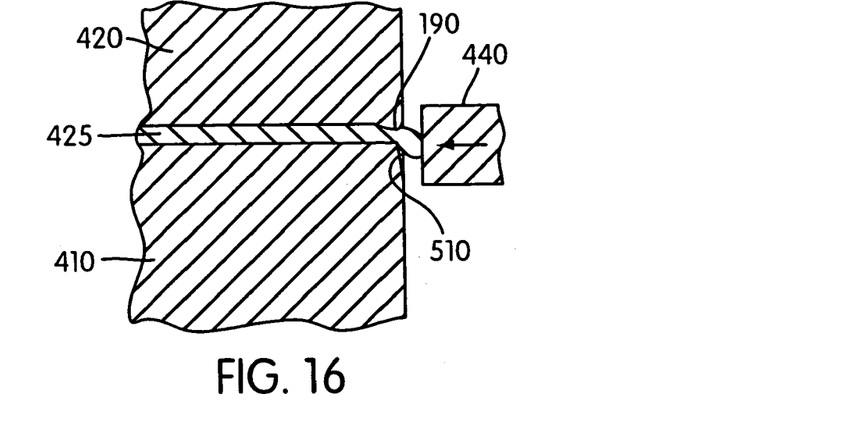
Figure 17:
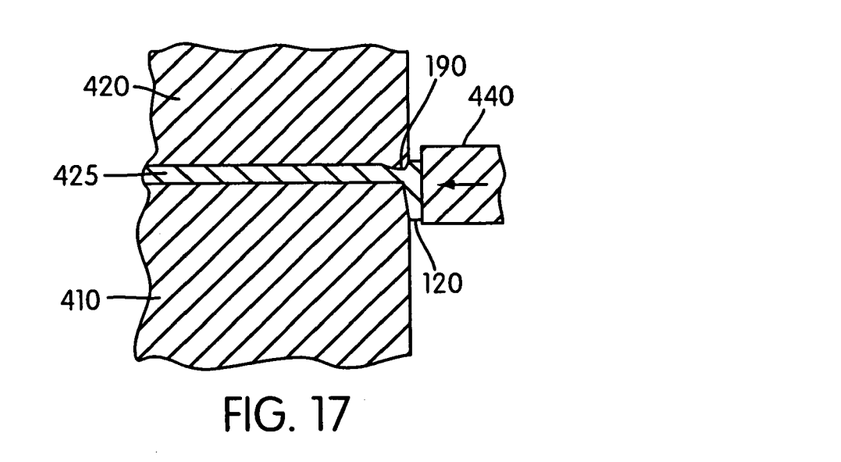

As illustrated in FIGS. 16 and 17, the head punch 440 moves toward the head-shaped depression 510 to form the head 120 of the nail 100. The head-shaped depression 510 guides the metal flow so that the head 120 forms at the correct offset from the shank 110. The continuous manufacturing process of the machine 400 then returns to the step illustrated in FIG. 13, where the machine 400 pushes the nail 100 out of the gripping elements 410,420 and forms its tip 130.

While the manufacturing process employed by the machine 400 is illustrated in a specific sequential order in FIGS. 13-17, various other sequences may also be used without departing from the scope of the present invention. For example, the tip cutter 445 may cut the tip 130 of the previously formed nail 100' and separate it from the next nail 100 before the gripping elements 410, 420 grip the next nail 100 (i.e., by switching the order of the gripping and cutting steps illustrated in FIG. 14)). As an alternative to the above-described nail 100 manufacturing sequence of the machine 400, the head-forming end 520 of the wire strand 425 may be bent downwardly before being positioned between the gripping elements 410, 420. As would be appreciated by one of ordinary skill in the art, a variety of other sequences may also be employed to manufacture the nail 100.

Figure 18:
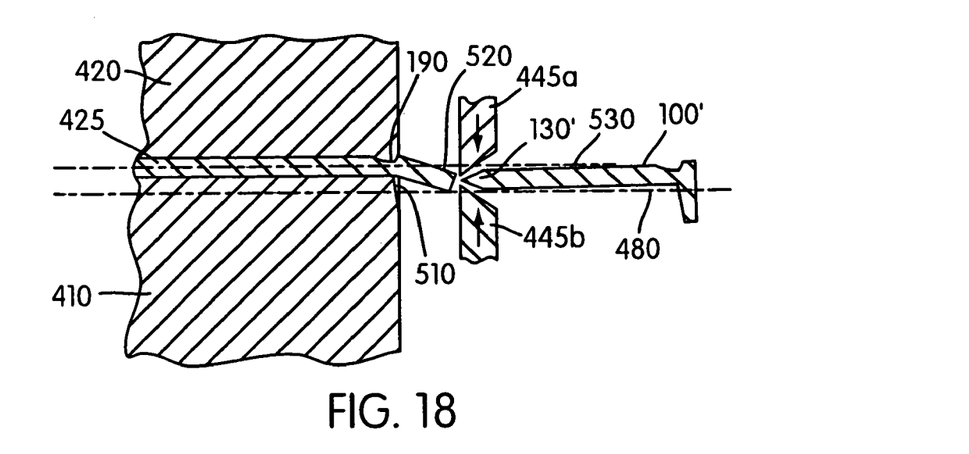
FIG. 18 is a sectional view of an additional embodiment of a wire nail manufacturing machine according to the present invention.

As illustrated in FIG. 18, the tip cutter 445 may both cut the wire strand 425 and prebend the head-forming end 520 so that the prebending machine 430 may be eliminated altogether. To serve the dual cutting/prebending functions, the cutter 445 is offset from the axis 530 of the wire strand 425 in the direction of the head depression axis 480 such that the upper and lower cutting blades 445a, 445b of the cutter 445 meet below the axis 530 (as viewed in FIG. 18). As the cutting blades 445a, 445b approach each other to cut the wire 425, the upper cutting blade 445a contacts the wire strand 425 before the lower cutting blade 445b. The upper cutting blade 445a then continues to move downwardly toward the lower cutting blade 445b and prebends the head-forming end 520. When the upper and lower cutting blades 445a, 445b finally meet, the cutter 445 forms the tip 130' of the previously formed nail 100' and separates the nail 100' from the head-forming end 520.

Figure 8A:
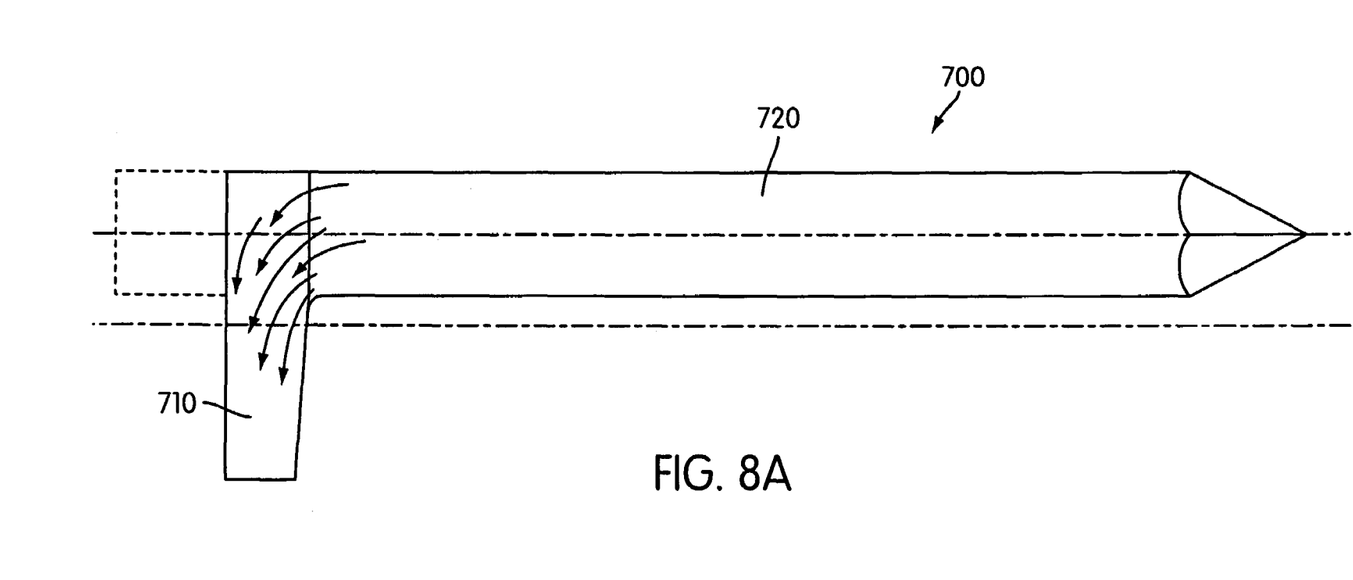
FIG. 8A is a side view of a wire nail according to an additional embodiment of the present invention.
Figure 8B:
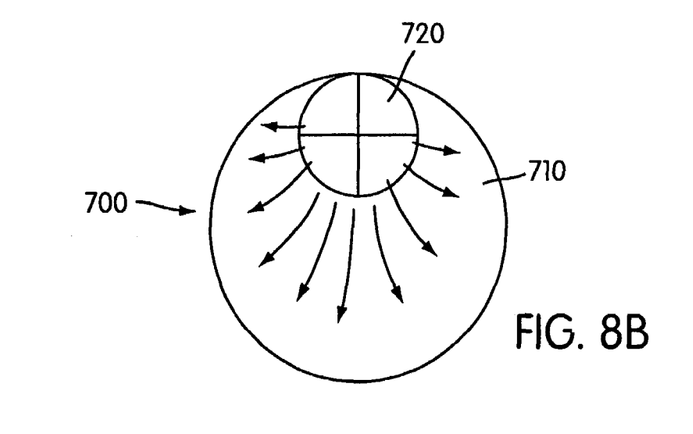
FIG. 8B is a front view of the wire nail of FIG. 8A.

Hereinafter, the advantages of the notch 190 and prebent head-forming end 520 will be described with reference to FIG. 8. In an effort to manufacture a full-round, offset-head nail that includes a peripheral shank surface and a circumferential head edge portion that are equally offset from the shank axis, the inventor of the present invention first designed and manufactured a nail 700 using conventional manufacturing methods. Like the nail 100, the nail 700 can be collated shank-to-shank and falls within the scope of the present invention. However, when the inventor manufactured the nail 700 using conventional manufacturing techniques, the resulting head 710 was not strongly attached to the shank 520 and would break off during collation or during driving in a nail-driving tool.

The inventor discovered that the weak attachment between the head 710 and shank 720 of the nail 700 resulted from manufacturing the nail 700 in the conventional manner. When forming a head of a conventional nail with a concentric shank and head, the metal at the head-forming end of the wire flows radially outwardly in all directions to form a full-round head. This conventional metal flow results in a strong head/shank attachment because the metal naturally wants to flow radially outwardly in all directions (i.e., in the direction of least resistance). The process is similar for conventional partially-offset-head nails. When the head and shank axes are only partially offset from each other, head-forming wire still flows at least to some extent in every direction so that strong head/shank connections are formed. Some conventional nail manufacturing machines bend the head-forming end of the wire strand before forming the head.

In contrast with such conventional partially-offset-head nails, the inventor discovered that when manufacturing the offset-head nail 700 with coextensive (i.e., equally offset relative to the shank axis in one radial direction) circumferential head 710 and shank 720 surfaces, the head-forming punch must force head-forming metal from the offset wire strand to substantially flow in one direction away from the shank 720 and toward the center of the head 710. In FIGS. 8A and 8B, metal flow arrows are shown. The inventor determined that the one-directional metal flow, which was required during the formation of the head 710 of the offset-head nail 700, resulted in weak intersections between the head 710 and shank 720 of the nail 700.

The inventor discovered that the metal flow could be improved in a full-round head nail with equally offset, circumferential head and shank surfaces by forming a notch in the shank at the intersection between the shank and the head and/or prebending the wire strand prior to forming the head. Accordingly, during manufacture of the nail 100 in the nail manufacturing machine 400, the notch 190 is pressed into the shank 110 before the head 120 is formed. Because the notch 190 is disposed on an opposite side of the shank 110 from the main body of the head 120, formation of the notch 190 pushes the head-forming metal toward the axis 220 of the yet-to-be-formed head 120 and away from the yet-to-be-formed circumferential edge 210 of the head 120 of the nail 110 (see FIG. 14). Prebending the wire strand 425 further improves the metal flow because the head-forming end 520 of the wire strand is prebent toward a center of the head-shaped depression 510 in the gripping element 410 and yet-to-be-formed head 120 (see FIG. 15). Consequently, when the nail manufacturing machine 400 subsequently forms the head 120, head-forming metal from the head-forming end 520 of the wire strand 425 flows at least to some extent radially outwardly in all directions, including, at least to a small extent, toward the circumferential edge 210 portion that is offset from the shank axis 170 to an equal extent as the surface 160 (i.e., at the reference line 228) (see FIGS. 2, 16, and 17). The notch 190 and prebending thereby improve the metal flow during formation of the nail 100 and result in stronger connections between the head 120 and shank 110.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A strip of collated wire nails comprising:
    a plurality of wire nails, each of the plurality of wire nails comprising
    a full-round head defining a head axis; and
    a shank formed integrally with the head and defining a shank axis that is offset from the head axis, the shank having a reduced neck portion at an intersection between the shank and the head, the reduced neck portion having a surface that tapers as the shank extends to the head; and a fastener holding the plurality of wire nails in a line such that the shank axes of adjoining nails are parallel to each other and such that the shanks of adjoining nails touch each other.

2. The strip of collated wire nails according to claim 1, wherein the head axis and at least a portion of the tapered surface of the reduced neck portion being disposed on opposing sides of the shank axis.

3. The strip of collated wire nails according to claim 2, wherein the head axis of each nail is parallel to its associated shank axis.

4. The strip of collated wire nails according to claim 1, wherein, in a radial direction relative to the shank axis, an outer surface portion of the shank is spaced from the shank axis by a distance that is at least as large as a distance between the shank axis and a circumferential edge portion of the head in said radial direction.

5. The strip of collated wire nails according to claim 4, wherein the outer surface portion of the shank is circular in cross-section.

6. The strip of collated wire nails according to claim 5, wherein shank axes of adjoining shanks of adjoining nails are offset from each other by approximately a diameter of the shanks.

7. The strip of collated wire nails according to claim 4, wherein, in said radial direction, the outer surface portion of the shank is spaced from the shank axis by a distance that is larger than the distance between the shank axis and the circumferential edge portion of the head in said radial direction.

* * * * *